United States Patent [19]

Kage

[11] Patent Number: 4,841,571
[45] Date of Patent: Jun. 20, 1989

[54] PRIVACY SIGNAL TRANSMISSION SYSTEM

[75] Inventor: Kouzou Kage, Tokyo, Japan

[73] Assignee: NEC Corporation, Tokyo, Japan

[21] Appl. No.: 562,567

[22] Filed: Dec. 19, 1983

[30] Foreign Application Priority Data

Dec. 22, 1982 [JP] Japan ................................ 57-223892

[51] Int. Cl.$^4$ ............................................ H04K 1/10
[52] U.S. Cl. ......................................... 380/31; 380/9;
   455/102; 455/295; 332/110; 332/22; 332/41;
   375/26; 375/28; 375/34
[58] Field of Search ....................... 375/29, 26, 28, 34,
   375/38, 2.1; 380/9, 28, 33, 34, 49; 340/347 AD;
   455/28, 102; 332/110, 22, 41; 179/1.5 R;
   360/32

[56] References Cited

U.S. PATENT DOCUMENTS

| | | | |
|---|---|---|---|
| 2,399,469 | 4/1946 | Cook | 455/28 |
| 3,048,781 | 8/1962 | Glaser | 375/26 |
| 3,173,092 | 3/1965 | Meschi | 375/26 |
| 3,273,141 | 9/1966 | Hackett | 375/28 |
| 3,490,045 | 1/1970 | Boer et al. | 375/34 |
| 3,518,548 | 6/1970 | Greefkes et al. | 375/26 |
| 3,571,758 | 3/1971 | De Francesco | 332/11 D |
| 3,573,364 | 4/1971 | Shimamura | 375/26 |
| 3,784,743 | 1/1974 | Schroeder | 178/22.12 |
| 3,927,372 | 12/1975 | Zschunke | 375/26 |
| 3,973,199 | 8/1976 | Widmer | 375/26 |
| 4,008,435 | 2/1977 | Oshima | 375/28 |
| 4,099,122 | 7/1978 | van Buul | 375/26 |
| 4,179,659 | 12/1979 | Tashiro | 375/26 |
| 4,227,183 | 10/1980 | Ninomiya | 340/347 AD |
| 4,295,223 | 10/1981 | Shutterly | 179/1.5 R |
| 4,385,393 | 5/1983 | Chaure et al. | 375/26 |
| 4,516,163 | 5/1985 | Masuda et al. | 360/32 |

Primary Examiner—Stephen C. Buczinski
Assistant Examiner—Bernarr Earl Gregory
Attorney, Agent, or Firm—Sughrue, Mion, Zinn, Macpeak & Seas

[57] ABSTRACT

A privacy signal transmission system having a transmitter portion and a receiver portion. The transmitter portion digitizes an analog message signal and enciphers the digitized signal into a privacy signal before modulation and transmission to the receiver portion. The transmitter portion also extracts and modulates an analog error signal representative of the digitization error for transmission to the receiver portion. The receiver portion demodulates the digitized privacy signal and analog error signal, and after the privacy signal is deciphered and reconverted to an analog signal it is added to the received analog error to reconstitute the original analog message signal.

9 Claims, 3 Drawing Sheets

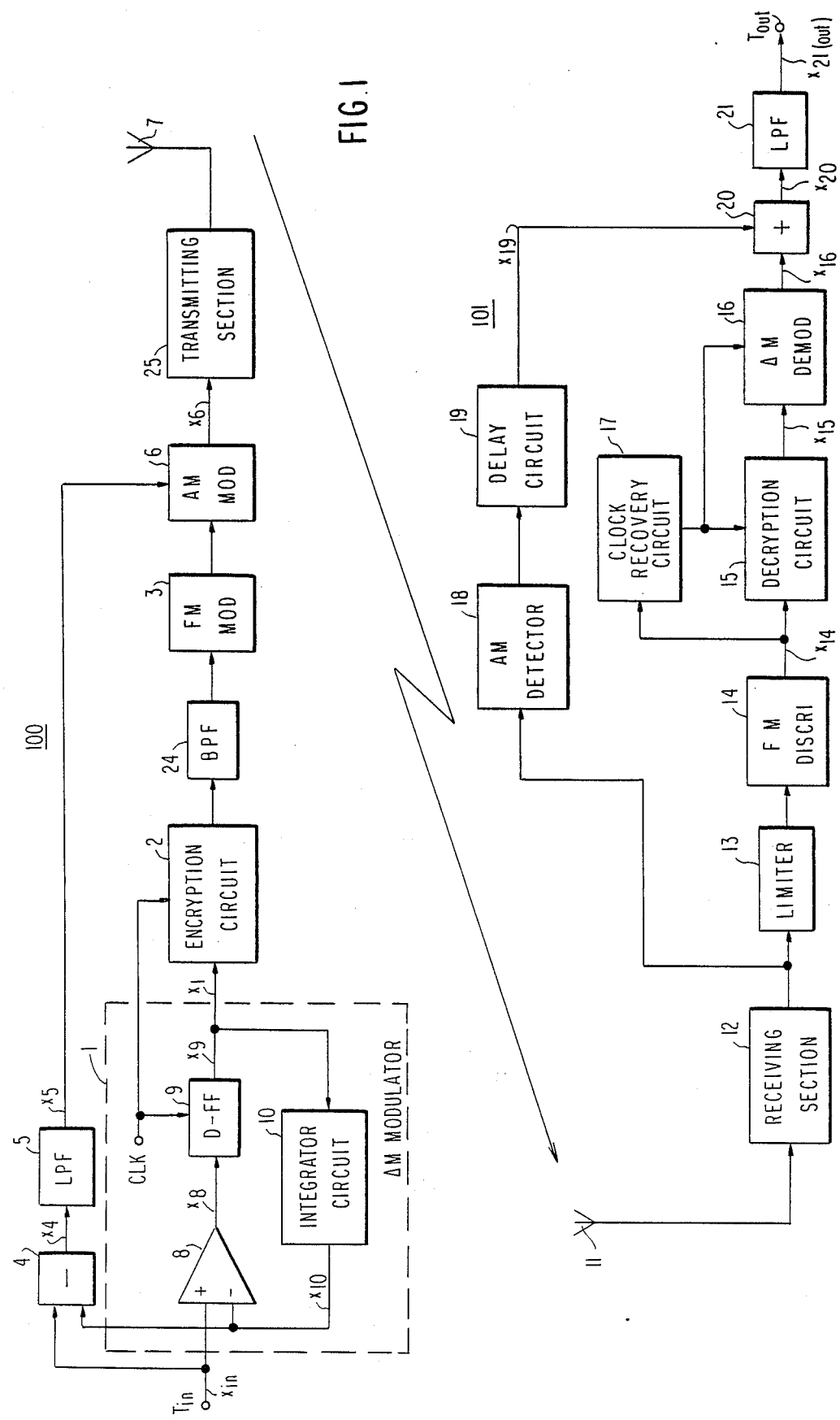

PRIVACY SIGNAL TRANSMISSION SYSTEM

BACKGROUND OF THE INVENTION

The present invention relates to a secret or privacy signal transmission system which sends out an audio signal or like analog signal after transforming it into a privacy signal.

A transmission system of the type described is not only capable of keeping eavesdroppers from communications between two parties but is also capable of eliminating leak message leaks when the parties are accidentally connected to a third party due to a transmission line failure.

Privacy signal transmission systems heretofore proposed may generally be classified into two types, i.e., a spectrum inversion type and a type which allows messages to be exchanged using privacy codes (e.g. key codes or PN codes) and digitally processing them for privacy. The spectrum inversion type system is not a perfect privacy implementation, however, since it inherently allows sound volumes to be identified and even part of voice overhead thereby allowing on unauthorized party to understand the communication. It is also deficient in the conversation leak occur in the event of common channel interference in a radio system having the same type of independent recivers The privacy code type system, on the other hand, is free from the possibility of eavesdropping or leak, since conversations are exchanged between only specific individuals who share common privacy codes (e.g. key codes or PN codes). Nevertheless, this brings about a problem in reproduction quality because transmission of a signal at a low rate, which is required to limit the transmission band in digital signal transmission, introduces quantization noise in the reproduced voice or substantial wave distortion due to quantization. If no limitation is imposed on the transmission frequency band to allow signals to be fed at a high rate, an encryption circuit will have to be scaled up and, therefore, expensive, even though the waveform distortion due to quantization noise may be suppressed.

Reference may be made to the following documents for details of the privacy code type signal transmission system:

(1) Whitfield Diffie et al. "New Directions in Cryptography", IEEE TRANSACTIONS OF INFORMATION THEORY, Vol. IT-22, No. 6, p.p. 644–654, November 1976.

(2) Horse Feistel et al. "Some Cryptographyic Techniques for Machine-to-Machine Data Communication", PROCEEDINGS OF THE IEEE, Vol. 63, No. 11, p.p. 1545–1555, November, 1975.

(3) U.S. Pat. No. 3,784,743 issued Jan. 8, 1974.

SUMMARY OF THE INVENTION

It is an object of the present invention to provide a privacy signal transmission system which is capable of transmitting quality analog signals despite the use of an inexpensive digital encryption circuit.

In accordance with the present invention, there is provided a privacy signal transmission system comprising a transmitter including digital pulse modulator means for converting a first analog signal into a first digital signal, encryption means for converting the first digital signal into a digital privacy signal, extractor means for extracting a first error signal representative of a difference between a second analog signal provided by analog conversion of the first digital signal and the first analog signal, and transmission means for transmitting the first error signal and the first digital privacy signal, and a receiver including means for receiving the first error signal and the first digital privacy signal to individually generate a second error signal and a second digital privacy signal, decryption means for converting the second digital privacy signal into a second digital signal, digital pulse demodulator means for converting the second digital signal into a third analog signal, and reproduction means for reproducing the first analog signal by adding the error signal to the third analog signal.

BRIEF DESCRIPTION OF THE DRAWINGS

Preferred embodiments of the present invention will in which:

FIG. 1 is a block diagram of a privacy signal transmission system embodying the present invention;

PREFERRED EMBODIMENTS OF THE INVENTION

Figure 2A:
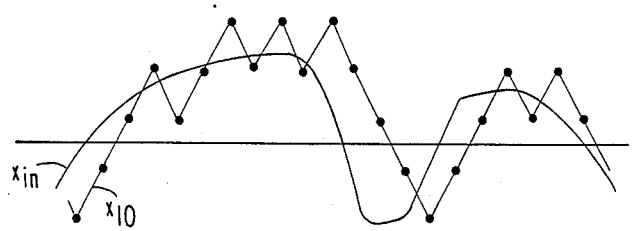
FIGS. 2A-2E are waveform diagrams representing the operation of the system shown in FIG. 1.
Figure 2B:
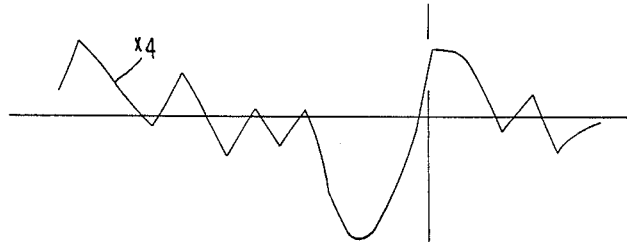
Figure 2C:
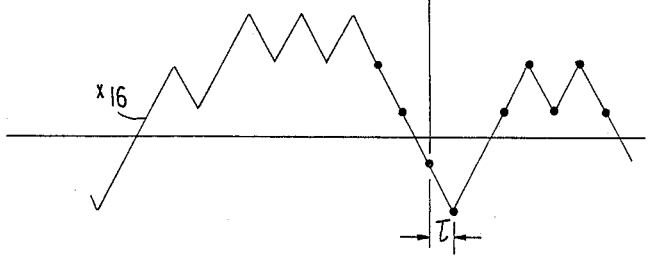
Figure 2D:
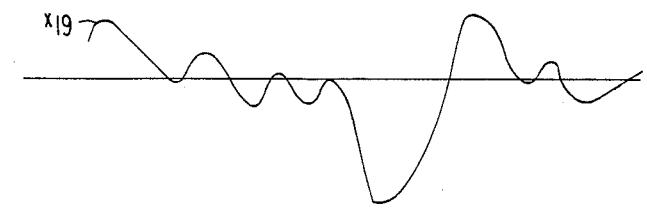
Figure 2E:
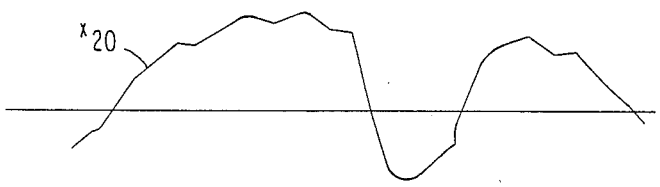

FIG. 1 of the drawings illustrates a privacy signal transmission system of the present invention is which a transmitter 100. A first analog audio signal Xin to be transmitted is applied to an input terminal Tin of the transmitter 100. A digital pulse modulator, indicated by a phantom block 1, transforms the input analog signal Xin into a digital signal $X_1$. In this particular embodiment, the digital pulse modulator 1 comprises a $\Delta M$ modulator which is well known in the art (e.g. MOTROLA MC 3417, MC 3418, MC 3517 or MC 3518). As shown, the $\Delta M$ modulator 1 is made up of a comparator 8, a D-type flip-flop (D-FF) 9, and an integrator 10. The comparator 8 compares a second analog audio signal, which is a reproduced signal $X_{10}$, with the first analog audio signal Xin coming in through the input terminal Tin. The output $X_8$ of the comparator 8 is extracted by the D-FF 9 using clock pulses CLK, which are generated by a clock pulse generator (not shown). The output of the D-FF 9 is in turn converted by the integrator 10 into the previously mentioned second analog audio signal $X_{10}$. It should be born in mind that the integrator output or second analog signal $X_{10}$ is always subordinate to the first analog signal Xin and has a waveform analogous to that of the latter signal Xin.

The digital audio signal $X_1$ ($=X_9$) is fed from the $\Delta M$ modulator 1 to an encryption, scrambling or private circuit 2 which is adapted to perform digital encryption on the input signal using privacy codes, such as PN codes and timed to the clock pulses CLK. The output of the encryption circuit 2 is fed through a bandpass filter 24 to a FM (frequency modulation) modulator 3 to be thereby converted into an FM wave. Taking into account the need for band limitation in the transmission path, BT is usually selected to be equal to or smaller than about 0.5 where B is the transmission band width and 1/T corresponds to the transmission rate.

Most of the audio signal is transmitted as a digital signal in the manner described above. In accordance with the present invention, even the rest of the signal (Xin−$X_{10}$), i.e., quantization error signal, is transmitted. A subtract or 4 included in the transmitter 100 serves to provide an error signal $X_4=Xin-X_{10}$. The subtractor 4 is connected to a low pass filter 5. The output of the FM modulator 3 is applied to an AM (amplitude modulation) modulator 6 at which it is subjected to amplitude modulation by an output $X_5$ of the low pass filter 5. The degree of amplitude modulation is selected to lie in a range which does not extremely widen the transmission band so as nat to effect the transmission error probability of the digital signal $X_1$ (approximately 0.1-0.2). The resulting AM wave $X_6$ is converted by a transmitting section 25 into a radio frequency wove and, then, sent out through an antenna 7.

A receiver 101 receives the high frequency which comes in through an antenna 11. In the receiver 101, a receiving section 12 transforms the high frequency into an intermediate frequency. The output of the receiving section 12 is applied to a limiter 13 and an AM detector 18. The limiter 13 removes the AM component from the intermediate frequency, while an FM discriminator 14 connected to the limiter 13 reproduces a digital privacy signal $X_{14}$. A decryption circuit or private circuit 15 deciphers the privacy signal $X_{14}$ using the same privacy code as the one used at the transmitter, thereby providing a digital audio signal $X_{15}$. Here, the privacy code is shared by the specific transmitter, and receiver only and is not identical with those of other receiver to which is. That is, only the receiver assigned the same code as the one assigned to the transmitter is capable of receiving messages. The digital audio signal $X_{15}$ is converted into an analog audio signal by a digital pulse demodulator 16. In this embodiment, the digital pulse demodulator 16 comprises a $\Delta M$ demodulator (e.g. MOTROLA MC 3417, MC 3418, MC 3517 or MC 3518).

So long as the transmission line is free from errors, the received digital audio signal $X_{16}$ represents information which is identical with the information represented by the transmitted digital audio signal $X_1$; the waveform of the output $X_{16}$ of the $\Delta M$ demodulator 16 is identical with that of the second analog audio signal $X_{10}$ in the $\Delta M$ modulator 1. A clock recovery circuit 17 recovers the clock pulses out of the FM discriminator output $X_{14}$, so that the recovered clock pulses may be used for operating the decryption circuit 15 and $\Delta M$ demodulator 16.

The error signal received by the receiving section 12 is detected by the AM detector 18 and then delayed by a delay circuit 19. The delay to be effected by the delay circuit 19 is preselected to be equal to a time lag between the instant when the first analog signal Xin applied to the transmitter is converted by the $\Delta M$ modulator 1 into a digital audio signal $X_1$ and the instant when the second analog signal is reproduce in the receiver by the $\Delta M$ demodulator 16. The delay circuit 19 is omissible, however, so long as the delay concerned is not substantial. The second analog signal $X_{16}$ output from the $\Delta M$ demodulator 16 and the error signal $X_{19}$ output from the delay circuit 19 are added together by an adder 20. The summation output $X_{20}$ of the adder 20 has a waveform which very much resembles that of the first analog signal Xin. Further, the output $X_{20}$ of the adder 20 is passed through a low pass filter 21 for removal of noise, thereby reproducing the desired first analog signal, $X_{21}$. The audio signal $X_{21}$ is delivered as an output signal Xout from an output terminal Tout.

Waveforms shown in FIG. 2 represent the operation of the system described above with reference to FIG. 1. FIG. 2A indicates the transmitter input signal Xin (first analog audio signal) and the signal $X_{10}$ in the $\Delta M$ modulator 1 (second analog audio signal). Although the signal $X_{10}$ is always subordinate to the input signal Xin as described, the quantization accuracy is lowered when the signal rate is low, as shown in FIG. 2A, preventing the waveform of the input signal Xin from being accurately reproduced. FIG. 2B represents an error signal between the input signal Xin and the signal $X_{10}$, $X_4=Xin-X_{10}$. FIG. 2C shows the output $X_{16}$ of the $\Delta M$ demodulator 16 which is reproduced at the receiver. Concerning the waveform, the signal shown in FIG. 2C is identical to the signal $X_{10}$ shown in FIG. 2A, but shifted by a transmission time $\tau$. Due to quantization error, should the signal $X_{16}$ be applied directly to the filter, quantization noise is substantial and, therefore, the error is too large to represent the input signal Xin. In the case of a $\Delta M$ modulation system whose data rate is on the order of 20 kb/S, for example, the demodulated output when simply applied to a filter would result in a significant degree of quantization noise or a noticeable waveform distortion due to quantization and thus, the attainable sound quality is quite poor. FIG. 2D represents the error signal $X_{19}$ reproduced at the receiver. While the error signal $X_{19}$ corresponds to the signal $X_4$ (FIG. 2B) which has been left unquantized by the $\Delta M$ modulator 1, its waveform is somewhat blunted compared to the signal $X_4$ due to frequency band limitation. FIG. 2E indicates the output $X_{20}$ of the adder 20 representative of the sum of the signal $X_{16}$ (FIG. 2C) and the signal $X_{19}$ (FIG. 2D). It will be seen that the summation output $X_{20}$ shown in FIG. 2E is quite analogous in waveform to the input signal Xin at the transmitter (FIG. 2A). Although the signal $X_{20}$ is locally somewhat angled, high quality reproduction of the first analog audio signal $X_{21}$ is achievable by applying it to the low pass filter 21.

Now, from the privacy standpoint, the system shown and described is perfect for use with an FM transmission path, since information converted into a digital audio signal is subjected to digital processing for privacy. Regarding the transmission path as an AM path, the error signal which failed to be converted into a digital signal, is sent out from the transmitter to the receiver. However, the privacy will not be detrimented in practice, in view of the fact that a majority of the energy components representative of audio information is transmitted as a digital signal; that is, it si difficult to extract the audio information from the remaining error signal. In this manner, the present invention is successful to fulfill two different considerations at the same time: privacy concerning the transmission path, and quality concerning a reproduced audio signal.

Figure 3:
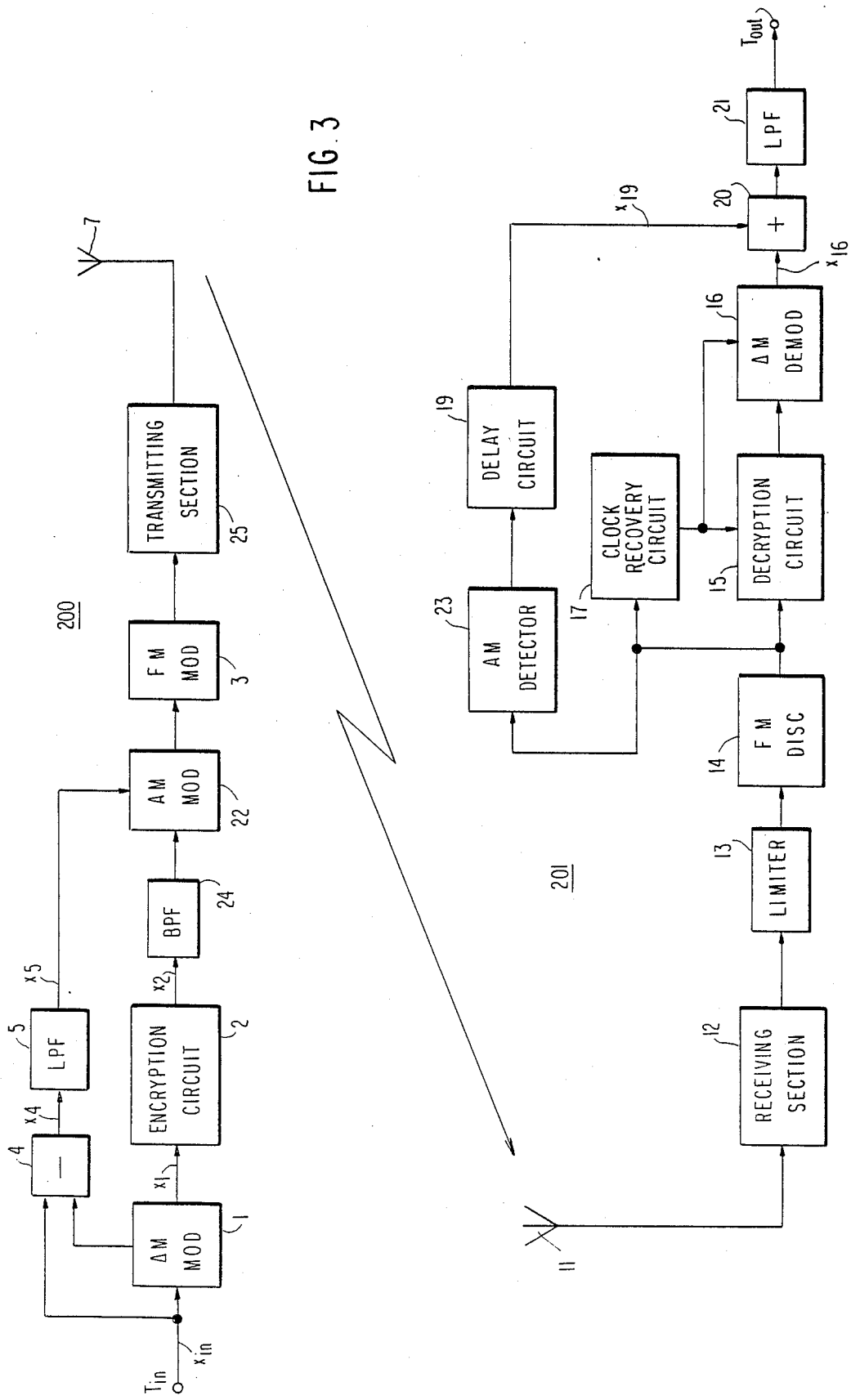
FIG. 3 is a block diagram of another embodiment of the present invention.

Referring to FIG. 3, another embodiment of the present invention is shown which includes a transmitter 200 and a receiver 201. The transmitter 200 includes a $\Delta M$ modulator 1, an encryption circuit 2, a subtractor 4, a low pass filter 5, a bandpass filter 24, and a transmitting section 25 which are respectively identical in function with those shown in FIG. 1. Therefore, the operation of these structural elements will not be described any further for.

What distinguishes the transmission system shown in FIG. 3 from that of FIG. 1 is the manner of transmission of an error signal. As shown in FIG. 3, the data $X_2$ output from the encryption circuit 2 is amplitude-modulated at an AM modulator 22 by the error signal $X_5$, output from the low pass filter 5. Again, the degree of modulation at the modulation 22 is so selected as not to enhance the transmission error rate of the digital audio signal. The error signal will be satisfactorily transmitted if data is subjected to amplitude modulation. For example, assuming a transmission path whose data rate is 20 kb/S, frequency components not higher than 3 kHz effective as an audio signal can be readily entrained out of the entire error signal by a wave having a rate 20 kb/S. The output of the AM modulator 22 is frequency-modulated by the FM modulator 3 and, then, sent out through the antenna 7.

The receiver 201 in FIG. 3, like the receiver 101 in FIG. 1, includes an antenna 11, a receiving section 12 for high frequency to intermediate frequency conversion, a limiter 13, an FM discriminator 14, a decryption circuit 15, a $\Delta M$ demodulator 16, a clock recovery circuit 17, an adder 20, and a low pass filter 21. Thus, the receiver 201 operates in the same manner as the receiver 101 in processing an audio signal which comes in through the antenna 11 as a digital privacy signal.

In the second embodiment shown in FIG. 3, in order to reproduce a received error signal, use is made of an AM detector 23 in the receiver which measures an amplitude from a received data waveform $X_{14}$ output from the FM demodulator 14. The output of the AM detector 23 is delayed by a delay circuit 19 by an amount which, as previously discussed, is equal to the time lag between the transmission of a digital signal which the $\Delta M$ modulator 1 of the transmitter provided by the conversion of an audio signal and the appearance of an analog signal from the $\Delta M$ demodulator 16 of the receiver.

As discussed in conjunction with the first embodiment, it is more preferable to listen to the summation signal of the signal $X_{16}$ output from the $\Delta M$ demodulator 16 and the error signal $X_{19}$ than to listen to the demodulator output $X_{16}$ only, for the quality of audio signal are so reproduced in bitter. Based on the same principle as stated in the first embodiment, the second embodiment of FIG. 3 insures privacy in the transmission path.

In the embodiment of FIG. 3, the modulator 22 comprises an AM modulator and use is made of an AM detector 23 accordingly. This is not restrictive, however, and may be replaced by any other suitable modulation system if the data rate is sufficiently high compared to the audio band (3 kHz). For example, modulation may be effected on the phase of data at the transmitter and detected at the receiver.

Furthermore, a $\Delta M$ modulator or demodulator has been employed in each of the foregoing embodiments in order to modulate an analog audio signal into a digital audio signal or to demodulate a digital audio signal into an analog audio signal. It will be apparent to those skilled in this art, however, that such is only illustrative and may be substituted for by a modulation and demodulator operable with any other digital pulse modulation principle (e.g. ordinary PCM (pulse code modulation) or DPCM (differential pulse code modulation)).

In summary, it will be seen that the present invention converts an analog audio signal into a digital signal and sends it out after digital encryption for privacy, while also transmitting the remaining error signal which has failed to be converted into a digital signal. In the transmission line, therefore, the digital privacy signal and the privacy in which cannot by itself be converted into the audio signal combination. Meanwhile, when common channel interference occurs in the radio system, another receiver is capable of overhearing nothing but noise if it converts the incoming digital audio signal into an analog signal, due to having a reproduced error signal to such an analog signal would allow no information. Concerning the quality of audio signal reproduction, the receiver is constructed to compensate a demodulated analog signal by adding a received error signal thereto. This reproduces an audio signal quite analogous in waveform to a transmitter input signal, thereby promoting high quality audio signal reproduction.

What is claimed is:

1. A privacy signal transmission system comprising:
   a transmitter including digital pulse modulator means for converting a first analog signal into a first digital signal said digital pulse modulator means including means for converting the first digital signal into a second analog signal, encryption means for converting the first digital signal into a first digital privacy signal, subtractor means for producing a first analog error signal representative of the difference between said second signal provided by analog conversion of the first digital signal and the first analog signal, and transmission means for transmitting a modulated signal in response to the first analog error signal and the first digital privacy signal; and
   a receiver including means for receiving the modulated signal including the first analog error signal and the first digital privacy signal to generate a second analog error signal and a second digital privacy signal, decryption means for converting the second digital privacy signal into a second digital signal, digital pulse demodulator means for converting the second digital signal into a third analog signal, and reproduction means for reproducing the first analog signal by adding the second analog error signal to the third analog signal.

2. A privacy signal transmission system as claimed in claim 1, in which the digital pulse modulator means comprises a $\Delta M$ modulator.

3. A privacy signal transmission system as claimed in claim 1, in which the transmission means comprises frequency modulator means for frequency-modulating a carrier with the first digital privacy signal, amplitude modulator means for amplitude-modulating an output of said frequency modulator means with the first analog error signal, and means for transmitting an output of said amplitude modulator means.

4. A privacy signal transmission system as claimed in claim 3, in which the receiving means includes an AM detector for generating said second analog signal and an FM discriminator for generating said second digital privacy signal.

5. A privacy signal transmission system as claimed in claim 1, in which the transmission means comprises amplitude modulator means for amplitude-modulating the first digital privacy signal with the first analog error signal, frequency modulator means for frequency-modulating a carrier with an output of said amplitude modulator means, and means for transmitting an output of said frequency modulator means.

6. A privacy signal transmission system as claimed in claim 5, in which the receiving means includes an FM discriminator for generating said second digital privacy signal and an AM detector connected to receive the output of said FM discriminator for generating said second analog signal.

7. A privacy signal transmission system as claimed in claim 1, in which the transmission means comprises means for phase-modulating the first digital privacy signal with the analog signal, frequency-modulating a carrier with the phase-modulated signal, and transmitting said frequency-modulated signal.

8. A transmitter for a privacy transmission system comprising:

digital pulse modulator means for converting a first analog signal into a first digital signal, said digital pulse modulator means including means for converting the first digital signal into a second analog signal encryption means for converting the first digital signal into a digital privacy signal, subtractor means for producing a first analog error signal representative of the difference between said second analog signal and said first analog signal, and transmission means for transmitting a modulated signal in response to the first analog error signal and the digital privacy signal.

9. A receiver for a privacy transmission system in which a transmitter transmits a modulated signal in response to a first digital privacy signal and a first analog error signal representative of a first analog signal comprising:

means for receiving the modulated signal including said first analog error signal and said first digital privacy signal to generate a second analog error signal and a second digital privacy signal, decryption means for converting the second digital privacy signal into a second digital signal, digital pulse demodulator means for converting the second digital signal into a third analog signal, and reproduction means for reproducing the first analog signal by adding the second analog error signal to the third analog signal.

* * * * *

UNITED STATES PATENT AND TRADEMARK OFFICE
CERTIFICATE OF CORRECTION

PATENT NO. : 4,841,571

DATED : June 20, 1989

INVENTOR(S) : KOUZOU KAGE

It is certified that error appears in the above-identified patent and that said Letters Patent is hereby corrected as shown below:

```
Col. 1, line 23, change "on" to --an--;
        line 27, change "recivers" to --receivers--.
Col. 2, line 16, after "will" insert --be described with
                 reference to the accompanying drawings--;
        line 28, delete "is"; and after "which" insert --includes--.
Col. 3, line 8,  change "nat" to --not--;
        line 12, change "wove" to --wave--;
        line 26, change "receiver to which is" to --receivers--;
        line 27, after "receiver" insert --to which is--;
        line 52, change "reproduce" to --reproduced--.
Col. 4, line 46, change "si" to --is--.
Col. 5, line 36, change "in bitter" to --is better--;
        line 54, change "modulation" to --modulator--;
        line 64, change "privacy in" to --error signal--;
        line 65, after "signal" insert --insure privacy in--.
Col. 6, line 1,  after "having a" insert --different privacy code
                 assigned thereto. Adding the--;
        line 2,  after "information" insert --to be received--;
        line 49, after "analog" insert --error--;
        line 65, after ""analog" insert --error--;
```

Signed and Sealed this

Nineteenth Day of December, 1989

Attest:

JEFFREY M. SAMUELS

Attesting Officer     Acting Commissioner of Patents and Trademarks